(12) United States Patent
Contractor et al.

(10) Patent No.: US 8,788,500 B2
(45) Date of Patent: Jul. 22, 2014

(54) ELECTRONIC MAIL DUPLICATE DETECTION

(75) Inventors: Danish Contractor, Haryana (IN); Manjula Golla Hosurmath, Bangalore (IN); Sachindra Joshi, New Delhi (IN); Kenney Ng, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 280 days.

(21) Appl. No.: 12/879,478

(22) Filed: Sep. 10, 2010

(65) Prior Publication Data

US 2012/0066209 A1    Mar. 15, 2012

(51) Int. Cl.
*G06F 17/30*    (2006.01)

(52) U.S. Cl.
USPC .......................................... 707/737; 707/740

(58) Field of Classification Search
USPC ................. 707/723, 741, 755, 769, 737, 740; 709/206; 715/752
See application file for complete search history.

(56) References Cited

U.S. PATENT DOCUMENTS

| | | | |
|---|---|---|---|
| 5,404,488 A * | 4/1995 | Kerrigan et al. | 711/133 |
| 6,510,453 B1 | 1/2003 | Apfel et al. | |
| 6,820,081 B1 | 11/2004 | Kawai et al. | |
| 7,539,871 B1 | 5/2009 | Osborn | |
| 7,574,409 B2 * | 8/2009 | Patinkin | 706/12 |
| 7,716,217 B2 | 5/2010 | Marston et al. | |
| 7,725,475 B1 * | 5/2010 | Alspector et al. | 707/758 |
| 7,743,051 B1 | 6/2010 | Kashyap et al. | |
| 8,010,466 B2 * | 8/2011 | Patinkin | 706/12 |
| 8,032,534 B2 | 10/2011 | Lee et al. | |
| 8,200,762 B2 | 6/2012 | Staats | |
| 8,266,430 B1 | 9/2012 | Lumb | |
| 8,351,678 B1 * | 1/2013 | Medina, III | 382/137 |
| 8,429,178 B2 * | 4/2013 | Alspector et al. | 707/754 |
| 2003/0105716 A1 | 6/2003 | Sutton, Jr. et al. | |
| 2006/0095521 A1 * | 5/2006 | Patinkin | 709/206 |
| 2007/0255803 A1 * | 11/2007 | Cherian | 709/217 |
| 2008/0183826 A1 * | 7/2008 | Notani | 709/206 |
| 2008/0208992 A1 | 8/2008 | Madnani | |
| 2009/0012984 A1 | 1/2009 | Ravid et al. | |
| 2009/0089383 A1 | 4/2009 | Ngan | |
| 2009/0319500 A1 | 12/2009 | Agrawal et al. | |

(Continued)

FOREIGN PATENT DOCUMENTS

| | | |
|---|---|---|
| WO | 2006008733 | 1/2006 |
| WO | 2008137308 | 11/2008 |

OTHER PUBLICATIONS

"Encore Discovery Solutions Selects Equivio Technology for Near-Duplicate Detection and Email Thread Analysis", available at http://www.encorelegal.com/pdfs/Equivo-Technology-Press-Release.pdf, Aug. 10, 2009, Phoenix, Arizona.

(Continued)

*Primary Examiner* — Jean M Corrielus
(74) *Attorney, Agent, or Firm* — Ference & Associates LLC (57) ABSTRACT

Embodiments of the invention are related to a method and system for identifying linked electronic mails by receiving a query from a user, wherein the query comprises at least a segment of an electronic mail; and based on the segment received, rendering to the user at least one of related subsets or a related supersets of electronic mails related to the received segment, wherein the related subsets and related supersets are threads of the segment received and arranged in a hierarchical manner.

21 Claims, 8 Drawing Sheets

(56) References Cited

U.S. PATENT DOCUMENTS

| | | | |
|---|---|---|---|
| 2010/0017487 A1* | 1/2010 | Patinkin | 709/206 |
| 2010/0030798 A1* | 2/2010 | Kumar et al. | 707/102 |
| 2010/0169888 A1 | 7/2010 | Hare et al. | |
| 2010/0287196 A1 | 11/2010 | Shields et al. | |
| 2012/0158728 A1* | 6/2012 | Kumar et al. | 707/737 |
| 2012/0191716 A1* | 7/2012 | Omoigui | 707/740 |

OTHER PUBLICATIONS

Huy, Nguyen The, "Elimination of Redundant Emails", Honour Year Project Report, 2006-2007, National University of Singapore, available at http://www.comp.nus.edu.sg/~wongls/projects/redundant-mails/nguyen-report-4apr07.pdf.

Wu, Yejun, and Oard, Douglas, W., "Indexing Emails and Email Threads for Retrieval", SIGIR '05, Aug. 15-19, 2005, Salvador, Brazil, available at http://portal.acm.org/citation.cfm?id=1076180&dl=GUIDE&coll=GUIDE&CFID=64252189&CFTOKEN=34781219.

Carenini, Giuseppe et al., "Summarizing Email Conversations with Clue Words," WWW 2007, Banff, Alberta, Canada, May 8-12, 2007, pp. 91-100, ACM Digital Library.

Zhou, Xiaodong, "Discovering and Summarizing Email Conversations," Thesis, Feb. 2008, 140 pages, The University of British Columbia, Vancouver, Canada.

Yeh, Jen-Yuan and Harnly, Aaron, "Email Thread Reassembly Using Similarity Matching," CEAS 2006—Third Conference on Email and Anti-Spam, Jul. 27-28, 2006, Mountain View, California, USA, 8 pages.

* cited by examiner

ELECTRONIC MAIL DUPLICATE DETECTION

BACKGROUND

Electronic mail (e-mail) is a method of exchanging digital messages. E-mail systems are based on a store-and-forward model in which e-mail server computer systems accept, forward, deliver and store messages on behalf of users, who only need to connect to the e-mail infrastructure, typically an e-mail server, with a network-enabled device for the duration of message submission or retrieval. It may be sometimes desirable to find similar e-mails located in a database or a collection of e-mails. E-mail thread refer to establishing a relationship within multiple e-mails within a set of e-mails, which may be related.

SUMMARY

Embodiments of the invention disclose a method, a system and a product for building and analyzing an e-mail thread hierarchy. Accordingly, embodiments of the invention includes identifying related electronic mail (hereinafter referred to as e-mail) in a set of e-mails by receiving a query from a user, wherein the query comprises at least a segment of an electronic mail, and based on the segment received, rendering to the user all related subsets and all related supersets of electronic mails related to the received segment, wherein the related subsets and related supersets are threads of the segment received and arranged in a hierarchical manner. In one embodiment, the hierarchy is presented as a visual representation with weights, and the thread hierarchy is determined by near duplicate detection. In a further embodiment each electronic mail comprises a plurality of segments, and each segments has a unique signature. In yet another embodiment the threads of the received segment comprises finding other emails having similar segments using near duplicate duplication, and the received segment is a root node and the thread hierarchy is a child node, and based on the weights a of each of the child node a tread hierarchy is created. Each of the segments generated has a segment signature and can be indexed as a tree, wherein each signature has a root node and subsidiary nodes.

In one embodiment the method is configured to generate a plurality of segments (also broadly referred to as tags) in at least one e-mail from the e-mail collection by parsing content of the e-mails. Subsequently the method is configured to create corresponding segment signature for each segment of the plurality of segments, and populate a signature index using the generated segment signatures of the plurality of segments. In a further embodiments the method is configured to receive a query e-mail, generate a plurality of query segments in the query e-mail by parsing the content of the query e-mail, create corresponding query segment signature for each query segment of the plurality of query segments, and identify a query root segment and corresponding query root segment signature of the query e-mail. In yet a further embodiments the method is configured to receive a pre-defined token match threshold, identify a set of root segment signatures of the signature index, and compare the query root segment signature with each root segment signature of the set of root segment signatures of the signature index. In yet a further embodiments the method is configured to identify a subset of the signature index, where a match between the root segment signature and the query root segment signature is at least the pre-defined token match threshold, and build the e-mail thread hierarchy using the identified subset of the signature index.

BRIEF DESCRIPTION OF THE DRAWINGS

Embodiments of the invention will best be understood by reference to the following detailed description of an illustrative embodiment when read in conjunction with the accompanying drawings, wherein like reference numerals indicate like components, where features shown in the drawing are meant as illustrative of only some embodiments of the invention, and not of all embodiments of the invention, unless otherwise explicitly indicated, and implications to the contrary are otherwise not to be made, and in the drawings.

DETAILED DESCRIPTION

Principles of the embodiments of the invention are directed to a method, a system and a computer program product for analyzing emails and building an e-mail thread hierarchy.

Figure 1:
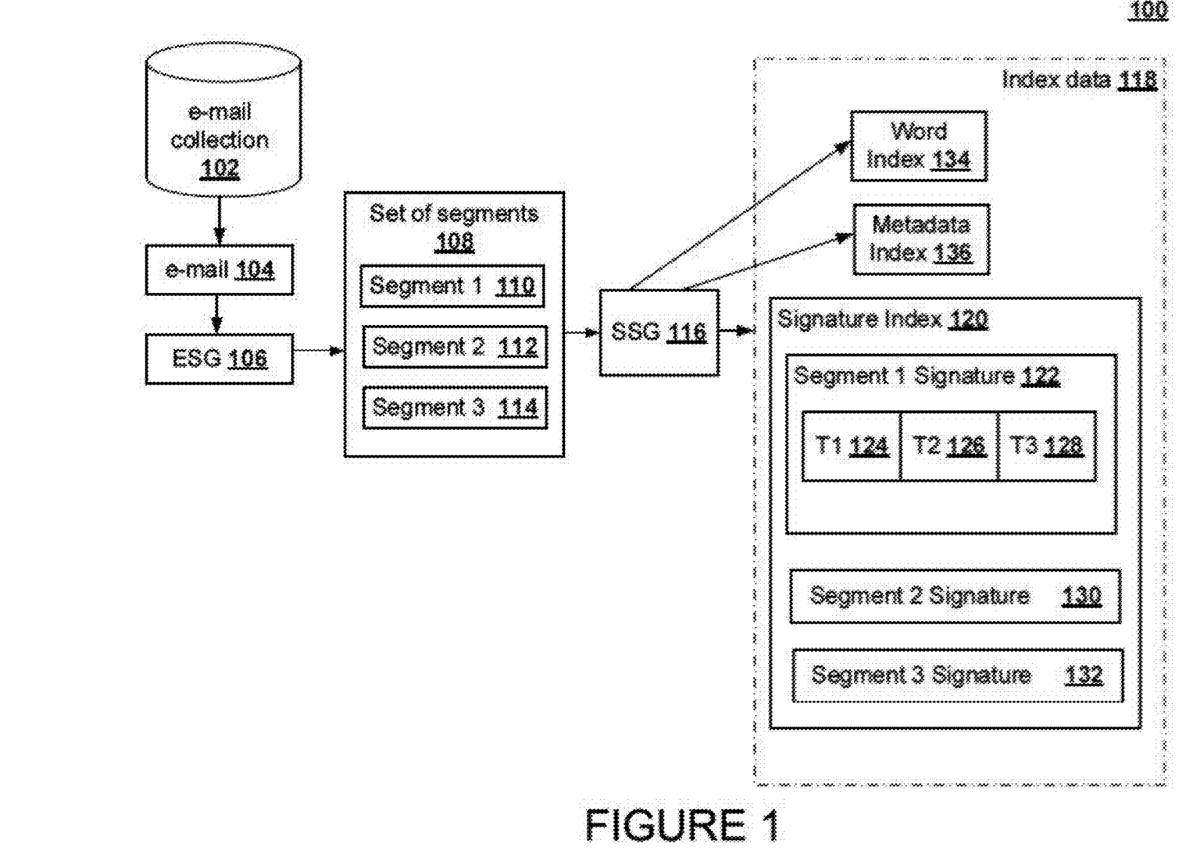
FIG. 1 illustrates an exemplary embodiment index data creation

FIG. 1 illustrates an exemplary embodiment 100 of an index data creation which has an e-mail collection 102 consisting of a plurality of e-mails. An exemplary e-mail from the e-mail collection 102 is exemplarily illustrated as element 104, which is provided to an e-mail segment generator (ESG) 106. The ESG 106 is configured to create a segment set 108, a segment signature generator (SSG) 116, and index data block 118. Segment set 108 includes several segments that have been created by the ESG 106. In the embodiments disclosed herein, segments refer to contents of exactly one e-mail. In one embodiment e-mail 104 may include some forwarded and/or replied to e-mails, and preferably those individual e-mails, which form a part of the chain of the original e-mail embedded within e-mail 104 are also termed as segments. In one embodiment, each segments created of the electronic mail will be assigned a unique signature.

As an exemplary embodiment three segments are illustrated for e-mail 104. These three segments are part of segment set 108, and are illustrated in FIG. 1 as segment1 110, segment2 112 and segment3 114. The ESG 106 is configured to identify each of these various segments 110, 112 and 114. Once these segments are identified, the SSG 116 is configured to create corresponding segment signature for each of the various segment. Preferably, in one embodiment, the SSG 116 while creating the corresponding segment signature may use the technique of near-duplicate detection, which is well known to one skilled in the art. Further, it should also be obvious to one skilled in the art that various other approaches may be used for creating the corresponding segment signatures as state of the art and such approaches fall within the scope of the embodiments of the present invention. SSG 116 preferably uses a pre-defined number of tokens and a set of pre-defined tokens. In an exemplary embodiment, segment1 signature 122 corresponds to segment1 110, segment2 signature 130 corresponds to segment2 112, and segment3 signature 132 corresponds to segment3 114.

In a further exemplary embodiment, for signature of segment1, the pre-defined number of tokens is three, thus signature 122 belonging to segment1 includes three tokens T1 124, T2 126 and T3 128, which are illustrated in FIG. 1. The set of pre-defined tokens includes at least one of a set of words and/or a set of numbers. Yet a further exemplary function of SSG 116 is to advantageously generate a word index 134 and/or a metadata index 136. Index data 118 may include, in an exemplary embodiment, a plurality of word index 134, metadata index 136 and signature index 120. Word index 134, in an exemplary embodiment may include at least one of keyword and subject information, and metadata index 136, in an exemplary embodiment may include at least one of temporal information and navigation information. According to a further embodiment, ESG 106 and SSG 116 may reside on a single processor or ESG 106 and SSG 116 may reside on separate processors. E-mail collection 102 may be a repository (not shown in Figure), such as a database or any other form of storage that may contain structured and/or unstructured information. The repository may reside on the same system having the processor or may be coupled to the processor of the system.

Figure 2:
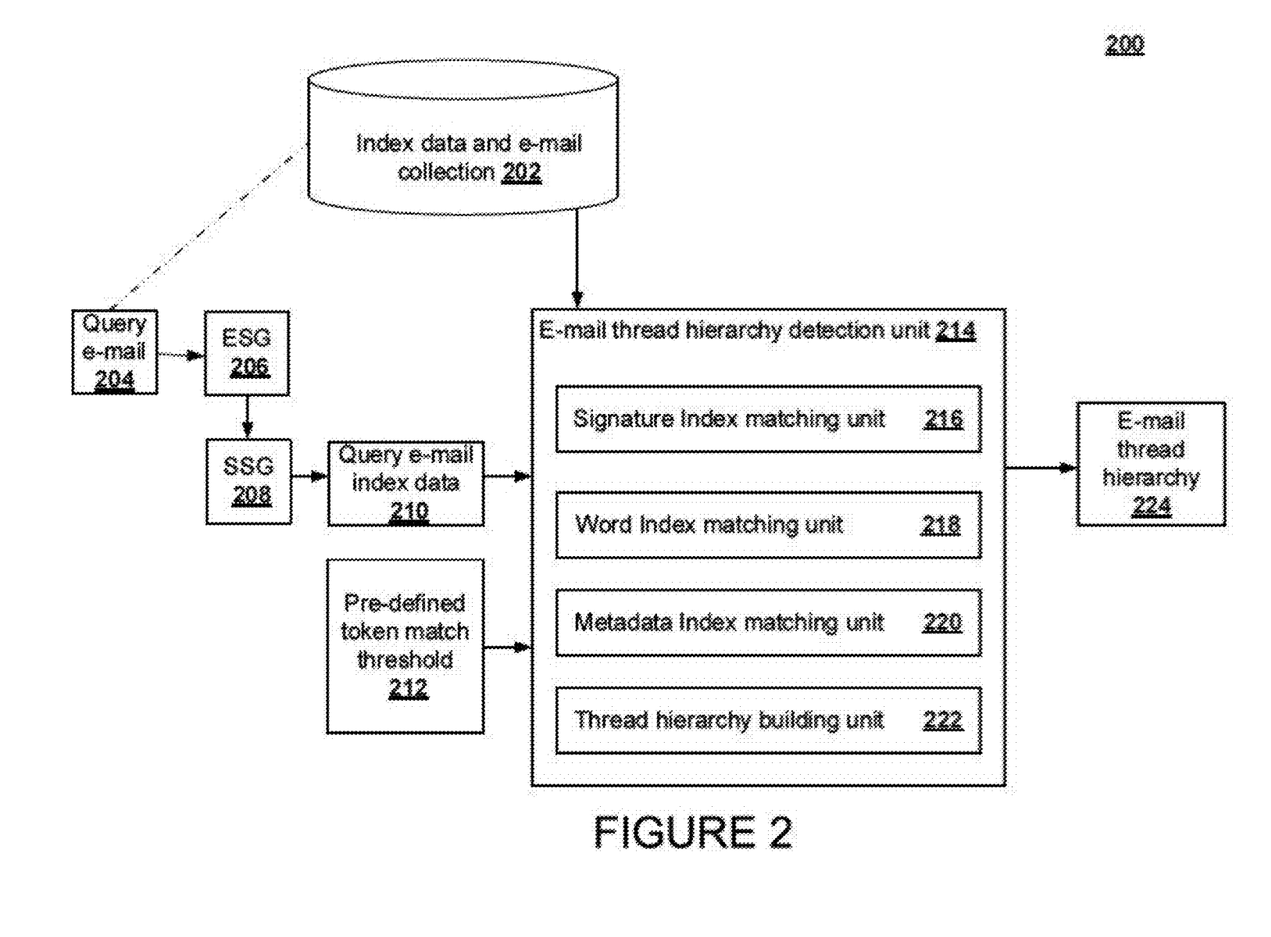
FIG. 2 illustrates an exemplary embodiment of building an e-mail thread hierarchy using index data created as shown in FIG. 1.

Reference is now made to FIG. 2, which illustrates an exemplary embodiment 200 of building an e-mail thread hierarchy using index data created. The exemplary embodiment of the invention includes a repository of index data and the e-mail collection 202. Embodiments of the invention illustrate a query e-mail 204, e-mail segment generator (ESG) 206, segment signature generator (SSG) 208, query index data 210, pre-defined token match threshold 212, e-mail thread hierarchy detection unit 214 and e-mail thread hierarchy 224. Preferably, in one embodiment, ESG 206 and SSG 208 may be similar to the ESG 106 and SSG 116 of FIG. 1. In one embodiment, preferably ESG 206 is adapted to receive query e-mail 204 and generate a plurality of query segments in the query e-mail by parsing content of the query e-mail. Once the query segments are identified, SSG 208 is adapted to create corresponding query segment signature for each query segment of the plurality of query segments. In one embodiment the e-mail thread hierarchy is presented as a visual representation including weights, wherein the weights indicate the position in the hierarchy or in one embodiment can present the thread hierarchy as a ranked list. There are various techniques know to assign weights or create a ranked list in prior and these fall within the scope of the present invention.

In one embodiment, SSG 208, while generating the corresponding query segment signature, uses the near duplicate detection approach. In a further exemplary embodiment, the function of SSG 208 may be configured to generate a query word index (not shown in the Figure) and/or a query metadata index (not shown in the Figure). Query e-mail index data 210 may include, in an exemplary embodiment, query word index, query metadata index and query signature index. The exemplary, query word index may include at least one of keyword and subject information, and exemplary query metadata index may include at least one of temporal information and navigation information. According to a further embodiment, ESG 206 and SSG 208 may reside on a single processor or separate processors. Repository of index data and the e-mail collection 202 may be a file system or a database, in one embodiment, residing on memory of the same system having the processor or may be residing on a separate memory that is coupled to the processor of the system.

E-mail thread hierarchy detection unit 214 is configured to receive a pre-defined token match threshold 212. In one embodiment, the pre-defined token match threshold may be provided by a user or may be built automatically by the system using artificial intelligence methods. This pre-defined token match threshold is provided specifically to find a match between the root segment signature and the query root segment signature. In one embodiment, e-mail thread hierarchy detection unit 214 may include a signature index matching unit 216, a word index matching unit 218, a metadata index matching unit 220, and a thread hierarchy building unit 222. In a further embodiment, e-mail thread hierarchy detection unit 214 may be on the same processor that includes ESG 206 and/or SSG 208. Signature index matching unit 216 is configured to identify a query root segment and a corresponding query root segment signature of the query e-mail. Signature index matching unit 216 is further configured to identify a set of root segment signatures of the signature index, wherein the signature index corresponds to each of the emails and compare the query root segment signature with each root segment signature of the set of root segment signatures of the signature index. Signature index matching unit 216 is further adapted to identify a subset of the signature index. A match between the root segment signature and the query root segment signature found to be that match which is at least the same or closest to pre-defined token match threshold 212.

Word index matching unit 218 is configured to identify a set of query words, compare at least one of the set of query words with contents of the word index associated with the subset of the signature index and modify the subset of the signature index in response to the comparing the set of query words with the contents of the word index.

Matadata index matching unit 220 is configured to identify a query metadata, compare the query metadata with contents of the metadata index associated with the subset of the signature index and modify the subset of the signature index in response to the comparing the query metadata with the contents of the metadata index.

Thread hierarchy building unit 222 is configured to build the e-mail thread hierarchy using the identified subset of the signature index. Thread hierarchy building unit 222 is further configured to identify a first e-mail having only one segment, wherein the first e-mail is corresponding to the query root segment signature in the subset of the signature index, and assign the first e-mail as a root node of the e-mail thread hierarchy 224. Thread hierarchy building unit 222, in a recursive manner, for all e-mails corresponding to the subset of the signature index, and is further configured to compare a plurality of segment signatures from the subset of the signature index using a near duplicate detection approach, determine a position of corresponding e-mail in the e-mail thread hierarchy 224, in response to the comparing a plurality of segment signatures from the subset of the signature index, update the e-mail thread hierarchy 224, and render, preferably to a user, the e-mail thread hierarchy 224.

Figure 3:
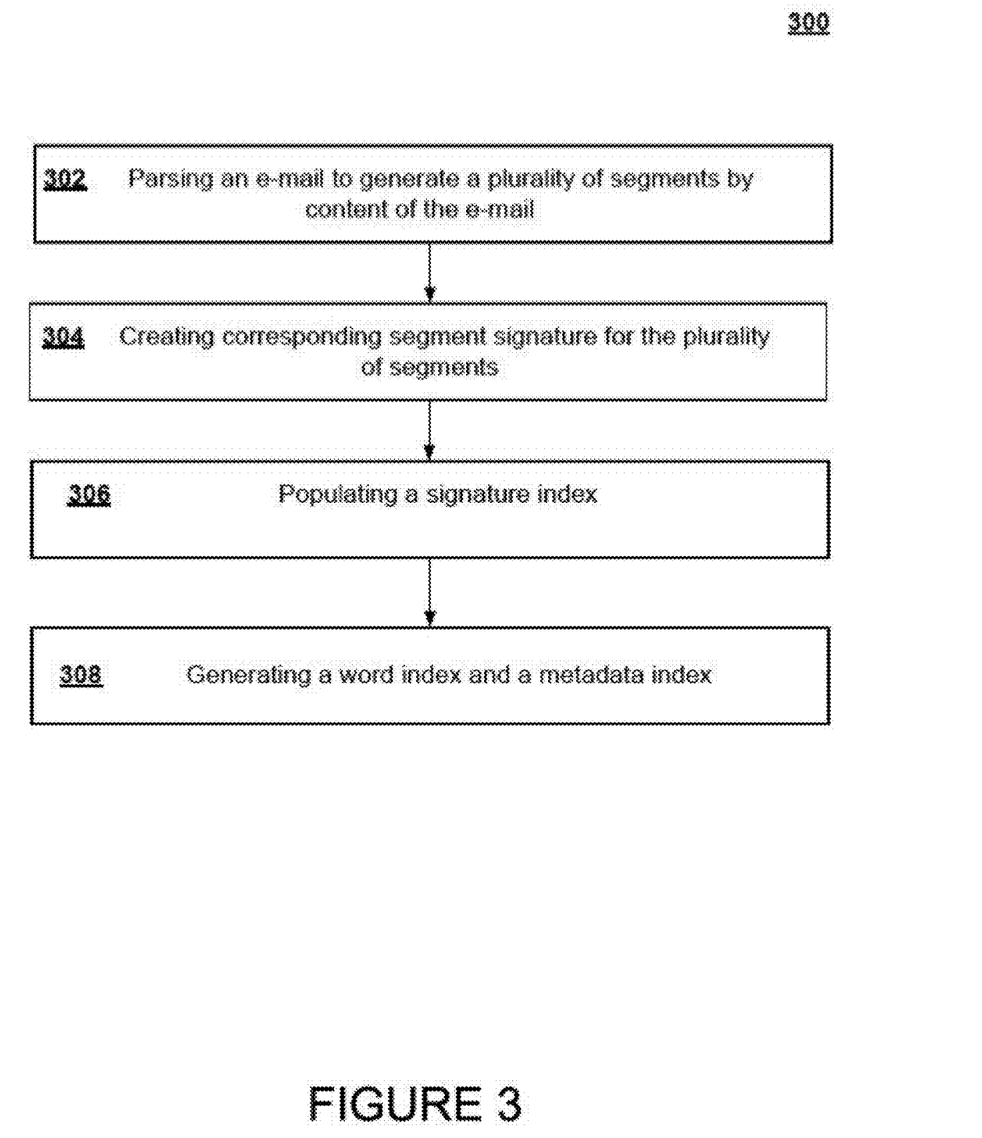
FIG. 3 illustrates an exemplary embodiment of a flow chart for creating index data.

Reference is now made to FIG. 3 illustrating an exemplary flow chart 300 for creating index data. In step 302 at least one e-mail from the e-mail collection is parsed to generate a plurality of segments based on content of the at least one e-mail. In step 304 corresponding segment signature for each segment of the plurality of segments is created. In step 304 corresponding segment signature are generated preferably using near-duplicate detection approach as well as a pre-defined number of tokens and a set of pre-defined tokens. As discussed earlier, it should be obvious to one skilled in the art that various other techniques for generating segment signatures may be used, and all such techniques fall within the scope of the embodiments of the present invention. The set of pre-defined tokens comprises at least one of a set of words and a set of numbers. In step 306 a signature index is populated using the generated segment signatures of the plurality of segments. In step 308 at least one of a word index and a metadata index is generated, wherein the word index includes at least one of keyword and subject information, and the metadata index includes at least one of temporal information and navigation information.

Figure 4A:
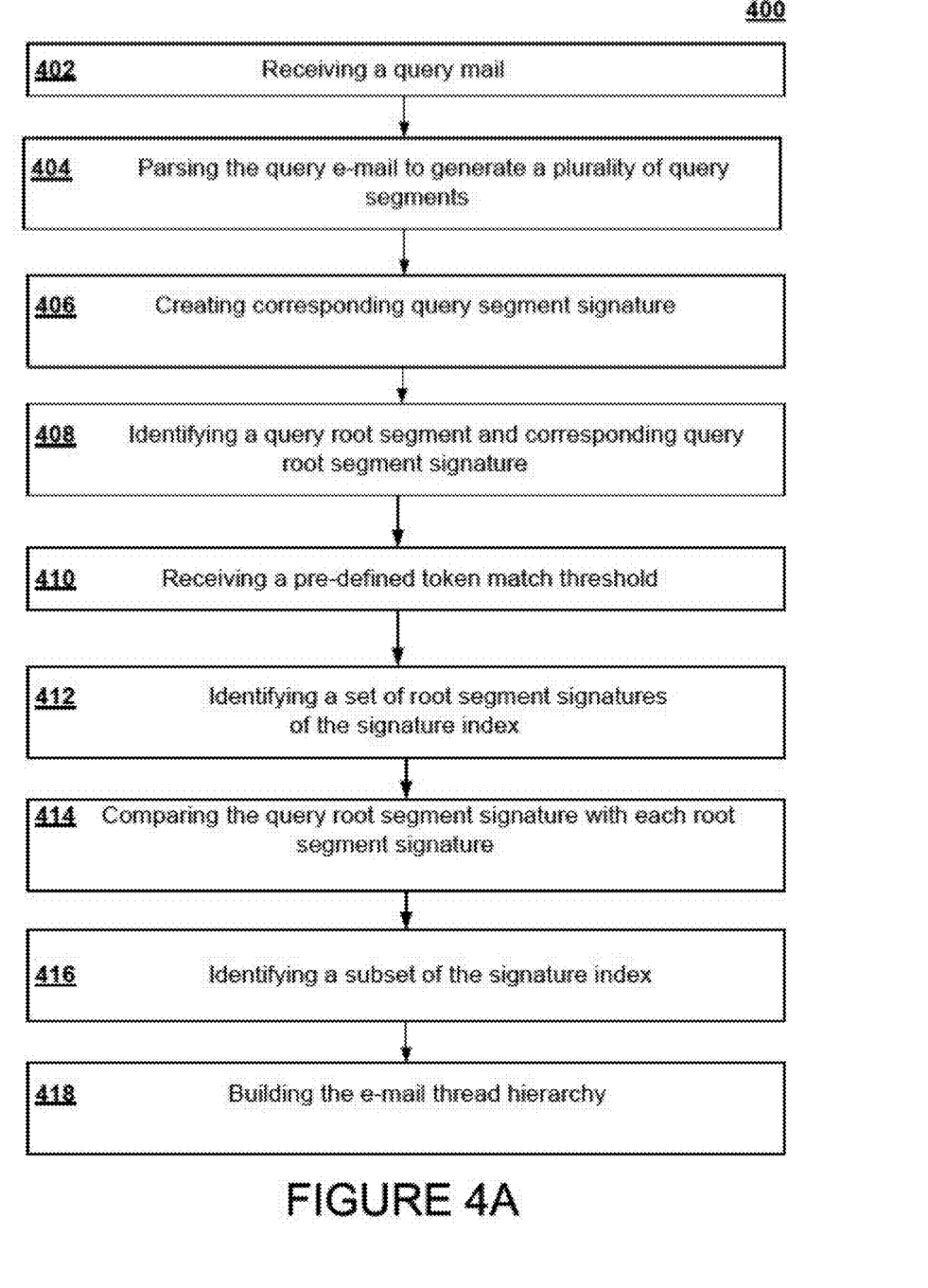
FIG. 4A illustrates an exemplary embodiment of a flow chart for overall method of building e-mail thread hierarchy using index data.

Reference is now made to FIG. 4A illustrating an exemplary embodiment of a flow chart 400 of an overall method of building e-mail thread hierarchy using index data. In step 402 a query e-mail is received. In step 404 the query e-mail is parsed to generate a plurality of query segments based on content of the query e-mail. In step 406 corresponding query segment signature for each query segment of the plurality of query segments is created. In step 408 a query root segment and corresponding query root segment signature of the query e-mail is identified. In step 410 a pre-defined token match threshold is received. In step 412 a set of root segment signatures of the signature index is identified, as defined previously. In step 414 the query root segment signature is compared with each root segment signature of the set of root segment signatures of the signature index. In step 416 a subset of the signature index is identified, wherein a match between the root segment signature and the query root segment signature is found to be similar to or closest to at least the pre-defined token match threshold, and in step 418 the e-mail thread hierarchy is built using the identified subset of the signature index.

Figure 4B:
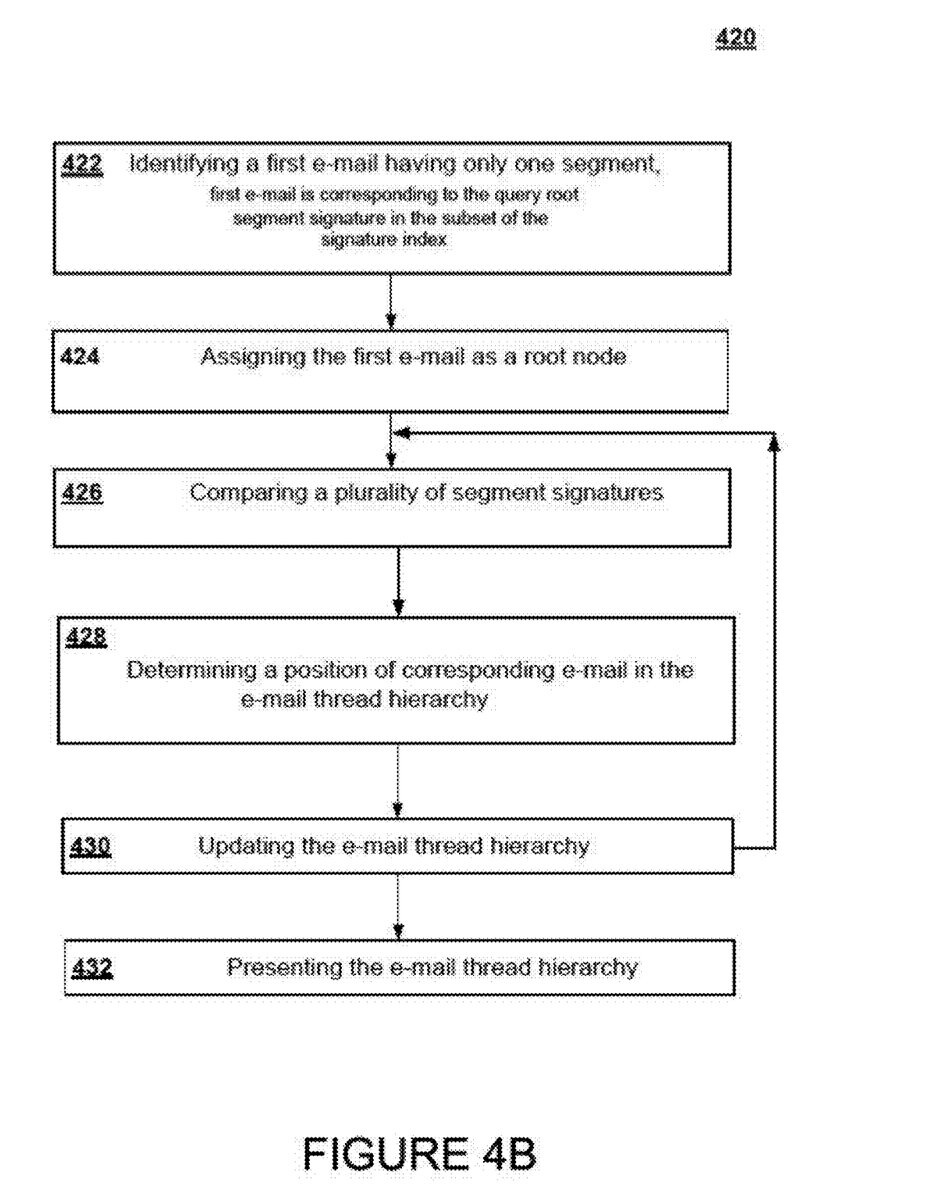
FIG. 4B illustrates an exemplary embodiment of a flow chart for details of building of e-mail thread hierarchy.

Reference is now made to FIG. 4B illustrating an exemplary embodiment of a flow chart 420, which explains step 418 of FIG. 4A of building of e-mail thread hierarchy in details. in step 422 a first e-mail having only one segment is identified, wherein the first e-mail is corresponds to the query root segment signature in the subset of the signature index. In step 424 the first e-mail is assigned as a root node of the e-mail thread hierarchy. Subsequently step 426, step 428 and step 430 are performed in a recursive manner until all e-mails corresponding to the identified subset of the signature index are exhausted. In step 426 a plurality of segment signatures from the subset of the signature index is compared using a near duplicate detection approach, and step 428 a position of corresponding e-mail in the e-mail thread hierarchy is determined, in response to the comparing a plurality of segment signatures from the subset of the signature index, and in step 430 the e-mail thread hierarchy is updated. Once the e-mail hierarchy is completed using the above recursive steps, in step 432 the e-mail thread hierarchy is presented or rendered, preferably to a user.

Figure 4C:
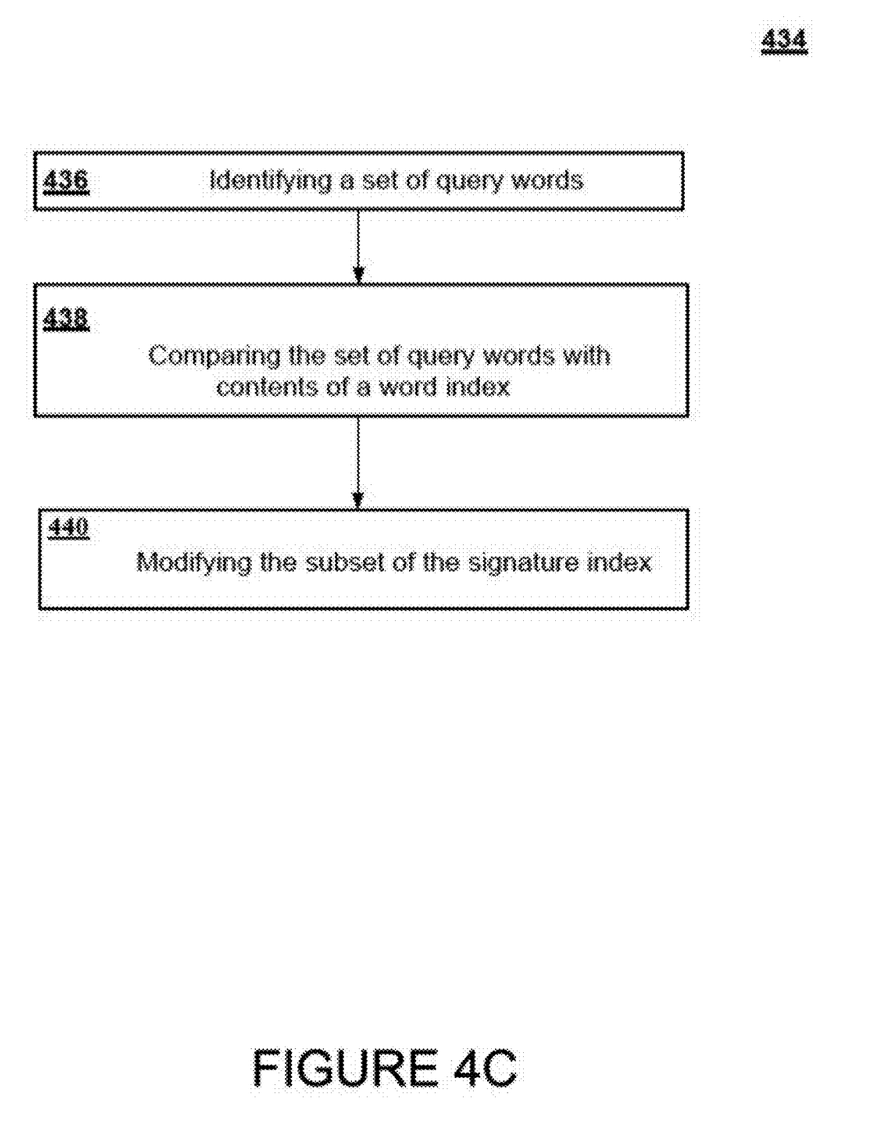
FIG. 4C illustrates an exemplary embodiment of a flow chart for using word index.

Reference is now made to FIG. 4C illustrating an exemplary embodiment of a flow chart 434 for using word index as disclosed in an exemplary embodiment of the invention. Flow chart 434, in one embodiment, may be additional details of step 416 of FIG. 4A. In step 436 a set of query words is identified. In step 438 the set of query words is compared with contents of a word index associated with the subset of the signature index, and in step 440 the subset of the signature index in response to the comparing the set of query words with the contents of the word index is modified.

Figure 4D:
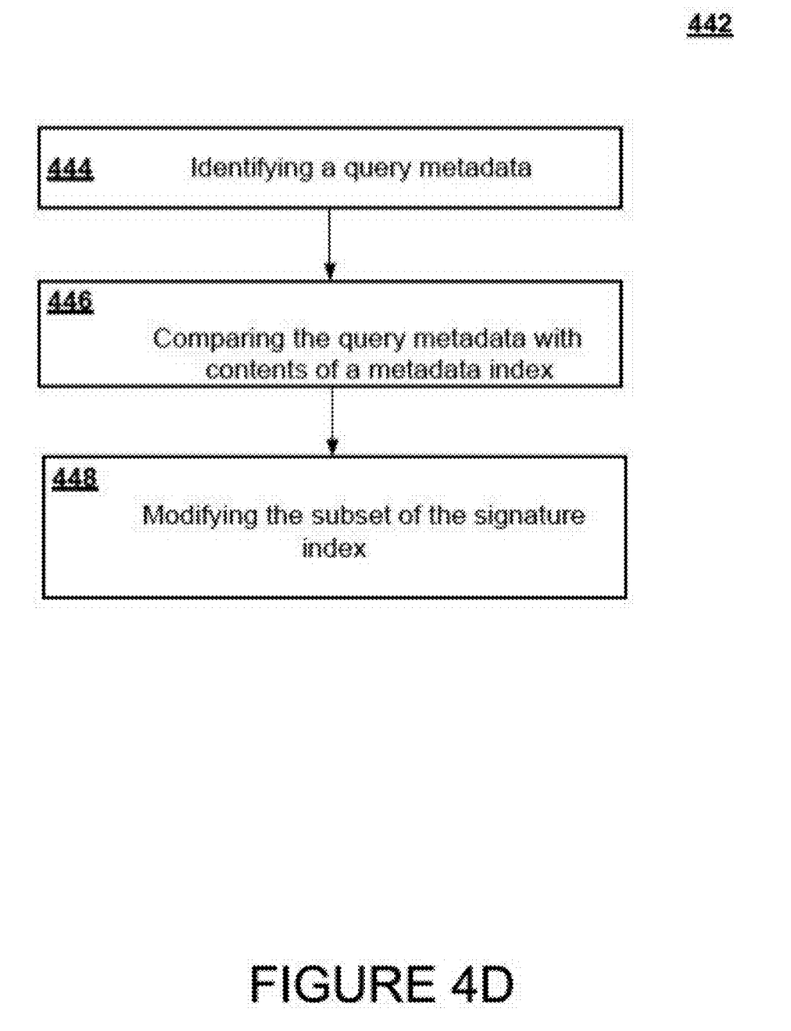
FIG. 4D illustrates an exemplary embodiment of a flow chart for using metadata index.

Reference is now made to FIG. 4D illustrating an exemplary embodiment of a flow chart 442 for using metadata index. In one embodiment, this may be associated as additional details of step 416 of FIG. 4A. In step 444 a query metadata is identified. In step the query metadata is compared with contents of a metadata index associated with the subset of the signature index. In step 448 the subset of the signature index in response to the comparing the query metadata with the contents of the metadata index is modified.

In an exemplary embodiment, an illustration of building the e-mail thread hierarchy disclosed. An exemplary e-mail collection has a total of eight e-mails: e-mail1 to e-mail8. After using the e-mail segment generator (ESG), the following segments are identified for all the eight e-mails. e-mail1=(a,b,c); e-mail2=(a,b,c,d); e-mail3=(a,d,e); email4=(a); e-mail5=(a,b); e-mail6=(x,y); e-mail7=(x,a); e-mail8=(q,r,s). In an exemplary embodiment, if the query e-mail is e-mail2=(a,b,c,d), and that the root is discovered as "a", using this root segment "a" as the basis, e-mail1, e-mail2, e-mail3, e-mail4, e-mail5 are selected as the subset of signature index.

In the exemplary case, a determination of similarity of "a" may be performed using near duplicate detection approach, where e-mail6, e-mail7, and e-mail8 are discarded. Since the root segment is "a" of the query e-mail e-mail2 is "a", e-mail4 is identified as the root node of the e-mail thread hierarchy. Further exploring e-mails corresponding to the subset of signature index, which have multiple segments, the e-mail thread hierarchy is built. Since e-mail5=(a,b), e-mail5 becomes a second level node. Email1=(a,b,c) then becomes a child of e-mail5. Thus in a recursive manner, a parent-child relationship may be built to evolve an e-mail thread hierarchy. The email thread hierarchy is as shown in Table 1 below:

TABLE 1

Figure 5:
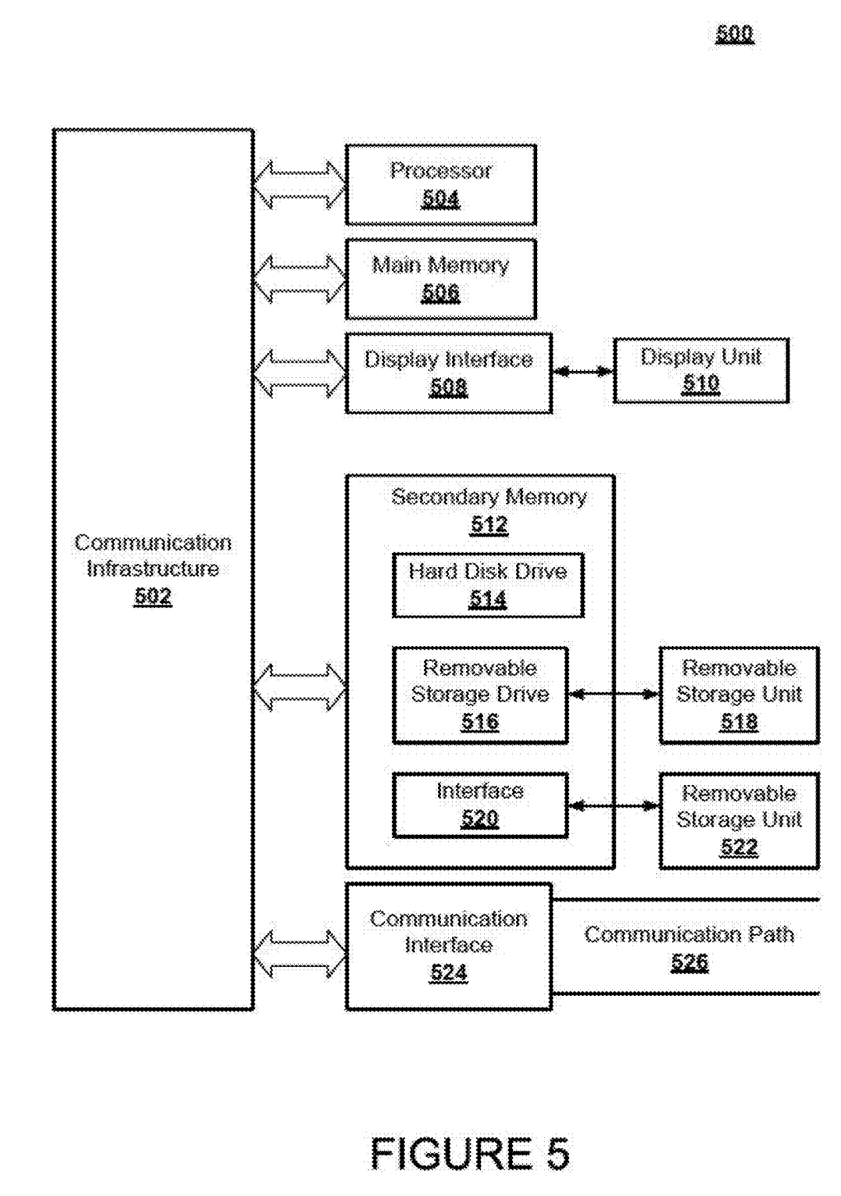
FIG. 5 illustrates an exemplary schematic of a data processing system used for building an e-mail thread hierarchy as disclosed in any one or more of FIG. 1, FIG. 2, FIG. 3 and FIG. 4A through FIG. 4D.

Reference is now made to FIG. 5 illustrating an exemplary embodiment of a data processing system 500, for example a computer system, portable electronic systems such as mobile phones and the likes, that can be used for implementing various embodiments of the present invention. In some embodiments, the data processing system 500 (hereinafter also referred to as a computer system) can be used to perform the method illustrated in FIG. 3 and/or FIGS. 4A to 4D. described. In some embodiments, the computer system 500 can be used as a system illustrated in FIG. 1 and/or FIG. 2. The computer system 500 includes a processor 504. It should be understood although FIG. 5 illustrates a single processor, one skilled in the art would appreciate that more than one processor can be included as needed. The processor 504 is coupled to a communication infrastructure 502, for example a communications bus, cross-over bar, or network, where the communication infrastructure 504 is configured to facilitate communication between various elements of the exemplary computer system 500. Various software embodiments are described in terms of this exemplary computer system. After reading this description, it will become apparent to a person of ordinary skill in the relevant art(s) how to implement the invention using other computer systems and/or computer architectures.

Exemplary computer system 500 can include a display interface 508 configured to forward graphics, text, and other data from the communication infrastructure 502 (or from a frame buffer not shown) for display on a display unit 510. The computer system 500 also includes a main memory 506, which can be random access memory (RAM), and may also include a secondary memory 512. The secondary memory 512 may include, for example, a hard disk drive 514 and/or a removable storage drive 516, representing a floppy disk drive, a magnetic tape drive, an optical disk drive, etc. The removable storage drive 516 reads from and/or writes to a removable storage unit 518 in a manner well known to those having ordinary skill in the art. The removable storage unit 518, represents, for example, a floppy disk, magnetic tape, optical disk, etc. which is read by and written to by the removable storage drive 516. As will be appreciated, the removable storage unit 518 includes a computer usable storage medium having stored therein computer software and/or data.

In exemplary embodiments, the secondary memory 512 may include other similar means for allowing computer programs or other instructions to be loaded into the computer system. Such means may include, for example, a removable storage unit 522 and an interface 520. Examples of such may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to the computer system 500.

The computer system 500 may also include a communications interface 524. The communications interface 524 allows software and data to be transferred between the computer system and external devices. Examples of the communications interface 524 may include a modem, a network interface (such as an Ethernet card), a communications port, a PCM-CIA slot and card, etc. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. These propagated signals are provided to the communications interface 524 via a communications path (that is, channel) 526. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Advantages of various embodiments of the invention include higher efficiency in communication data management and higher performance. Other advantages of some of the other embodiments include better and more readily useful representation of communication network for actionable knowledge. Advantages of some other embodiments may further include more efficient clustering and classification of e-mail data. Advantages of various embodiments of the invention may further include being able to generate missing e-mails if they occur as part of history of other e-mails.

Advantages of various embodiments of the invention include less reliance on only header data, or header attributes of e-mails in the e-mail collection, although it could be used as a yet another criteria. Advantages of various embodiments of the invention also facilitate "fuzzy" matching of tokens, due to the usage of near duplicate detection approach. Various embodiments of the invention make the matching of various segments of the e-mails tolerant to extra characters, such as ">" or ">>", those may get inserted due to various e-mail clients. Although the invention explains various advantages of the specific embodiments of the invention, those skilled in the art will appreciate from the teaching of the embodiments that the advantages of the invention are not limited to the above mentioned.

The described techniques may be implemented as a method, apparatus or article of manufacture involving software, firmware, micro-code, hardware such as logic, memory and/or any combination thereof. The term "article of manufacture" as used herein refers to code or logic and memory implemented in a medium, where such medium may include hardware logic and memory [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded may also include transmission signals propagating through space or a transmission media, such as an optical fiber, copper wire, etc. The transmission signal in which the code or logic is encoded may further include a wireless signal, satellite transmission, radio waves, infrared signals, Bluetooth, the internet etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may include a combination of hardware and software components in which the code is embodied, processed, and executed. Of course, those skilled in the art will recognize that many modifications may be made without departing from the scope of embodiments, and that the article of manufacture may include any information bearing medium. For example, the article of manufacture includes a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc. Elements that are in communication with each other need not be in continuous communication with each other, unless expressly specified otherwise. In addition, elements that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

Further, although process steps, method steps or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently. Further, some or all steps may be performed in run-time mode.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Although exemplary embodiments of the present invention have been described in detail, it should be understood that various changes, substitutions and alternations could be made thereto without departing from spirit and scope of the inventions as defined by the appended claims. Variations described for exemplary embodiments of the present invention can be realized in any combination desirable for each particular application. Thus particular limitations, and/or embodiment enhancements described herein, which may have particular advantages to a particular application, need not be used for all applications. Also, not all limitations need be implemented in methods, systems, and/or apparatuses including one or more concepts described with relation to exemplary embodiments of the present invention.

What is claimed is:

1. A method for identifying linked electronic mails, the method comprising:
   receiving a query from a user, wherein the query comprises at least a segment of an electronic mail;
   based on the segment received, identifying linked electronic mails via rendering to the user at least one of related subsets or related supersets of electronic mails related to the received segment, wherein the related subsets and related supersets are threads of the segment received and arranged in hierarchy;
   said rendering comprising:
   detecting at least one match between a query root segment signature of one the received segment and a root segment signature index, the root segment signature index comprising at least one of a word index and a metadata index, wherein the word index comprises at least one of a keyword and, and wherein the metadata index comprises at least one of temporal information and navigation information; said detecting comprising:
   receiving a pre-defined token match threshold;
   identifying a set of root segment signatures of the root segment signature index;
comparing the query root segment signature with each root segment signature of the set of root segment signatures of the root segment signature index;
   identifying a subset of the root segment signature index, wherein a match between the root segment signature and the query root segment signature is at least the pre-defined token match threshold; and
   building an electronic mail thread hierarchy based on the at least one detected match.

2. The method as claimed in claim 1, wherein the hierarchy is presented as a visual representation.

3. The method as claimed in claim 1, wherein the hierarchy is determined by at least one of near duplicate detection or similarity measure.

4. The method as claimed in claim 1, further comprises locating other emails having similar segments using near duplicate detection.

5. The method as claimed in claim 1, wherein the received segment is a root node.

6. The method as claimed in claim 5, wherein the thread hierarchy comprises at least one child node.

7. The method as claimed in claim 6, wherein said building further comprises assigning weights to each of the root node and at least one child node; and
creating a thread hierarchy based on the weights assigned to each of the child node.

8. The method as claimed in claim 6, wherein the repository comprise at least one of structured data and unstructured data.

9. The method as claimed in claim 1, wherein the electronic mail and the segments are stored in a repository.

10. The method as claimed in claim 1, wherein each electronic mail comprises at least a plurality of segments, and each segment of the electronic mail created has a unique signature.

11. A data processing system comprising at least a processor and a memory, the data processing system configured for identifying linked electronic mails, the system configured to perform:
receiving a query from a user, wherein the query comprises at least a segment of an electronic mail;
based on the segment received, identifying linked electronic mails via rendering to the user at least one of related subsets or related supersets of electronic mails related to the received segment, wherein the related subsets and related supersets are threads of the segment received and arranged in hierarchy;
said rendering comprising:
detecting at least one match between a query root segment signature of the received segment and a root segment signature index, the root segment signature index comprising at least one of a word index and a metadata index, wherein the word index comprises at least one of a keyword and subject information, and wherein the metadata index comprises at least one of temporal information and navigation information;
said detecting comprising:
receiving a pre-defined token match threshold;
identifying a set of root segment signatures of the root segment signature index;
comparing the query root segment signature with each root segment signature of the set of root segment signatures of the root segment signature index;
identifying a subset of the root segment signature index, wherein a match between the root segment signature and the query root segment signature is at least the pre-defined token match threshold; and
building an electronic mail thread hierarchy based on the at least one detected match.

12. The system as claimed in claim 11, wherein the hierarchy is presented as a visual representation.

13. The system as claimed in claim 11, wherein the hierarchy is determined by at least one of near duplicate detection or similarity measure.

14. The system as claimed in claim 11, wherein each electronic mail comprises at least a plurality of segments.

15. The system as claimed in claim 14, wherein each segments of the electronic mall created has a unique signature.

16. The system as claimed in claim 11, wherein the system is further configured to locate other emails having similar segments using near duplicate detection.

17. The system as claimed in claim 11, wherein the received segment is a root node.

18. The system as claimed in claim 17, wherein the thread hierarchy comprises at least one child node.

19. The system as claimed in claim 18, wherein said building further comprises
assigning weights to each of the root node and at least one child node; and
creating a thread hierarchy based on the weights assigned to each of the child node.

20. The system as claimed in claim 11, wherein the electronic mail and the segments are stored in a repository.

21. The system as claimed in claim 20, wherein the repository comprise at least one of structured data and unstructured data.

* * * * *